(12) United States Patent
Li et al.

(10) Patent No.: US 12,265,244 B2
(45) Date of Patent: Apr. 1, 2025

(54) OPTICAL FILM, POLARIZER AND DISPLAY DEVICE

(71) Applicant: TCL CHINA STAR OPTOELECTRONICS TECHNOLOGY CO., LTD., Guangdong (CN)

(72) Inventors: Ji Li, Guangdong (CN); Hanming Li, Guangdong (CN); Guang Zeng, Guangdong (CN); Fang Tan, Guangdong (CN); Hongshan Yin, Guangdong (CN); Kai Chen, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/459,260

(22) Filed: Aug. 31, 2023

(65) Prior Publication Data

US 2024/0345303 A1 Oct. 17, 2024

(30) Foreign Application Priority Data

Apr. 13, 2023 (CN) .......................... 202310394644.2

(51) Int. Cl.
*G02B 5/30* (2006.01)
*G02F 1/1335* (2006.01)
*G02F 1/1337* (2006.01)

(52) U.S. Cl.
CPC ....... *G02B 5/305* (2013.01); *G02F 1/133504* (2013.01); *G02F 1/133528* (2013.01);
(Continued)

(58) Field of Classification Search
CPC ............... G02B 5/305; G02F 1/133504; G02F 1/133528; C09K 2323/03; C09K 2323/031
See application file for complete search history.

(56) References Cited

U.S. PATENT DOCUMENTS

| 5,108,964 A | 4/1992 | Corbett |
| 5,427,712 A | 6/1995 | Nakamura |

(Continued)

FOREIGN PATENT DOCUMENTS

| CN | 113682020 A | 11/2021 | |
| CN | 116107014 B * | 9/2023 | ............... C08L 33/10 |

(Continued)

OTHER PUBLICATIONS

Chinese Office Action issued in corresponding Chinese Patent Application No. 202310394644.2 dated May 18, 2023, pp. 1-8.

(Continued)

*Primary Examiner* — Sophie Hon
(74) *Attorney, Agent, or Firm* — PV IP PC; Wei Te Chung (57) ABSTRACT

Disclosed are an optical film, a polarizer, and a display device. The optical film includes a resin and a light diffuser mixed with the resin. The light diffuser includes a whisker and a modifying group attached to a surface of the whisker. The modifying group has a structural formula of —X-A-R, wherein X is selected from $SO_3$ or $PO_4H$, A is selected from a single bond, a substituted or unsubstituted aromatic hydrocarbon group containing 6 to 20 ring atoms, or an imidazolinyl group, and R is selected from a substituted or unsubstituted alkyl group containing 2 to 20 carbon atoms, a substituted or unsubstituted siloxy group containing 2 to 20 carbon atoms, or an alkylolamide group containing 2 to 20 carbon atoms.

16 Claims, 7 Drawing Sheets

(52) U.S. Cl.
CPC .... *G02F 1/133711* (2013.01); *C09K 2323/03* (2020.08); *C09K 2323/031* (2020.08)

(56) References Cited

U.S. PATENT DOCUMENTS

| | | | | |
|---|---|---|---|---|
| 2007/0030417 | A1* | 2/2007 | Kubo | B29C 55/06 |
| | | | | 349/96 |
| 2012/0015169 | A1* | 1/2012 | Ohta | G02B 1/04 |
| | | | | 156/263 |

FOREIGN PATENT DOCUMENTS

| | | | | |
|---|---|---|---|---|
| JP | 2004226503 | A | * | 8/2004 |
| JP | 2007293295 | A | | 11/2007 |
| JP | 2008158462 | A | * | 7/2008 |
| JP | 2008304658 | A | | 12/2008 |
| JP | 2013006891 | A | | 1/2013 |
| KR | 20080008786 | A | | 1/2008 |
| KR | 101184448 | B1 | | 7/2010 |
| WO | 2022209643 | A1 | | 10/2022 |

OTHER PUBLICATIONS

Chinese Office Action issued in corresponding Chinese Patent Application No. 202310394644.2 dated Jun. 14, 2023, pp. 1-5.
Korean Office Action issued in corresponding Korean Patent Application No. 10-2023-0115075 dated Dec. 21, 2023, pp. 1-6.

* cited by examiner

Calcium carbonate whiskers — Calcium carbonate whiskers under alkaline conditions — After modification

OPTICAL FILM, POLARIZER AND DISPLAY DEVICE

CROSS-REFERENCE TO RELATED APPLICATION

The present disclosure claims priority to and the benefit of Chinese Patent Application No. 202310394644.2, filed on Apr. 13, 2023, the disclosure of which is incorporated herein by reference in its entirety.

TECHNICAL FIELD

The present disclosure relates to the field of display, and in particular, to an optical film, a polarizer, and a display device.

BACKGROUND OF INVENTION

The vertical Alignment liquid crystal (VA) display technology is widely used in large-sized liquid crystal display panels due to higher contrast and wider viewing angle. However, the VA-type display panel still has a problem of relatively obvious chromaticity viewing angle, and there is a color deviation in the display image of the VA-type display panel as the viewing angle gradually increases. An existing solution is to add a functional resin film on the polarizer, and add a whisker with a specific size to the resin film.

However, during the process of preparing a functional resin film, the whisker tends to break during the process of mixing and stirring with the resin, which affects the effect of the functional resin film on improving the chromaticity viewing angle of the display panel.

SUMMARY OF INVENTION

Embodiments of the present disclosure provide an optical film, a polarizer, and a display device to solve the technical problem that whiskers are easily broken when a functional resin film of an existing display panel is prepared.

To solve the above problems, the present disclosure provides technical solutions as follows:

Embodiments of the present disclosure provide an optical film. The optical film includes a resin and a light diffuser mixed with the resin. The light diffuser includes a whisker and a modifying group attached to a surface of the whisker. The modifying group has a structural formula of —X-A-R, wherein X is selected from $SO_3$ or $PO_4H$, A is selected from a single bond, a substituted or unsubstituted aromatic hydrocarbon group containing 6 to 20 ring atoms, or an imidazolinyl group, and R is selected from a substituted or unsubstituted alkyl group containing 2 to 20 carbon atoms, a substituted or unsubstituted siloxy group containing 2 to 20 carbon atoms, or an alkylolamide group containing 2 to 20 carbon atoms.

In some embodiments of the present disclosure, R has a general structure formula of in which $R_1$, $R_2$ and $R_3$ are independently selected from F, Cl, Br, I, or H, and n is an integer from 1 to 19.

In some embodiments of the present disclosure, $R_1$, $R_2$ and $R_3$ are independently selected from F or H, and at least one of $R_1$, $R_2$ and $R_3$ is selected from F; and/or X is selected from $SO_3$; and/or A is selected from substituted or unsubstituted aromatic hydrocarbon groups containing 6 to 20 ring atoms.

In some embodiments of the present disclosure, the modifying group is selected from at least one of the following structural formulae:

In some embodiments of the present disclosure, the resin comprises at least one of a polyvinyl alcohol resin, a transparent adhesive, an acrylate resin, a polyurethane resin, an epoxy resin, a vinyl resin, a silicone resin, a cellulose ester resin, a cyclic polyolefin resin, a polycarbonate resin, a polyester resin, a polyethersulfone resin, a polysulfone resin, a polyamide resin, a polyimide resin, an acyclic polyolefin resin, a polyacrylate resin, a polyvinyl alcohol resin, a polyvinyl chloride resin, and a polyvinylidene chloride resin.

In some embodiments of the present disclosure, an absolute value of a difference in refractive index between the resin and the light diffuser is greater than zero and less than or equal to 0.5; and/or a refractive index of the light diffuser is greater than or equal to 1.5 and less than or equal to 2.0; and/or a refractive index of the resin is greater than or equal to 1.5 and less than or equal to 2.0.

In some embodiments of the present disclosure, an included angle is formed between a long axis direction of the whisker of the optical film and a bottom surface of the optical film, and the included angle is greater than or equal to 0 degree and less than or equal to 40 degrees.

Embodiments of the present disclosure further provide a polarizer. The polarizer includes the optical film described in any of the above-mentioned embodiments, a protective layer disposed on one side of the optical film, and a release film disposed on an opposite side of the optical film.

In some embodiments of the present disclosure, the polarizer comprises the release film, a polarizing layer, a first substrate, a hard coating, and the protective layer that are sequentially stacked;

the optical film is reused as the polarizing layer, the first substrate, or the hard coating; and/or an adhesive layer is disposed between the first substrate and the hard coating, and the optical film is reused as the adhesive layer; and/or the optical film is disposed between the protective layer and the polarizing layer.

Embodiments of the present disclosure further provide a display device. The display device includes a display panel and the polarizer described in the above-mentioned embodiments, and the polarizer is disposed on a light-emitting side of the display device; or the display device includes a display panel, a polarizer, and the optical film described in the above-mentioned embodiments that are sequentially stacked.

Advantageously, the present disclosure provides an optical film, a polarizer, and a display device. The optical film includes a resin and a light diffuser mixed with the resin. The light diffuser includes a whisker and a modifying group attached to a surface of the whisker. The modifying group has a structural formula of —X-A-R, wherein X is selected from $SO_3$ or $PO_4H$, A is selected from a single bond, a substituted or unsubstituted aromatic hydrocarbon group containing 6 to 20 ring atoms, or an imidazolinyl group, and R is selected from a substituted or unsubstituted alkyl group containing 2 to 20 carbon atoms, a substituted or unsubstituted siloxy group containing 2 to 20 carbon atoms, or an alkylolamide group containing 2 to 20 carbon atoms. On the one hand, the optical film provided in the embodiments of the present disclosure can improve the dispersibility of the whiskers in the resin. On the other hand, due to the formation of a sulfonic shell layer or phosphate shell layer on the surface of the whisker particles, it can protect the whisker particles and enhance the toughness of the whisker particles to prevent the whiskers from broken. In addition, since the surface of the surface-modified whisker is connected with an organic layer, growth in the radial direction (short-diameter direction) is inhibited, and growth in the longitudinal direction (long-diameter direction) is unchanged, so that aspect ratio of the whiskers is increased, the probability that the whisker breaks during stirring is further reduced, and the chromaticity viewing angle of the optical film is improved, thus improving the performance.

BRIEF DESCRIPTION OF THE DRAWINGS

In order to more clearly describe the technical solutions in embodiments of the present disclosure or related arts, hereinafter, the appended drawings used for describing the embodiments in the present disclosure or related arts will be briefly introduced. Apparently, the appended drawings described below are only directed to some embodiments of the present disclosure, and for a person skilled in the art, without expenditure of creative labor, other drawings can be derived on the basis of these appended drawings.

EMBODIMENTS OF INVENTION

Hereinafter, technical solutions in embodiments of the present disclosure will be clearly and completely described with reference to the accompanying drawings in embodiments of the present disclosure. Obviously, the described embodiments are part of, but not all of, the embodiments of the present disclosure. All the other embodiments, obtained by a person with ordinary skill in the art on the basis of the embodiments in the present disclosure without expenditure of creative labor, belong to the protection scope of the present disclosure.

In description of the present disclosure, it should be understood that the terms such as "length", "thickness", "upper", "lower", etc. indicating an orientation or a positional relationship are based on an orientation or a positional relationship shown in the accompanying drawings, which are merely intended to facilitate descriptions of the present disclosure and simplify the descriptions, and are not intended to indicate or imply that a device or an element must have a specific orientation, be constructed and operated in a specific orientation, and therefore cannot be construed as a limitation of the present disclosure. In addition, the terms "first" and "second" are used for descriptive purposes only and cannot be understood as indicating or implying relative importance or implying a number of the indicated technical features. In the present disclosure, unless specified and limited otherwise, a first feature "on" a second feature may include direct contact of the first feature and the second feature, and it may also be included that the first feature and the second feature are not in direct contact but are contacted by additional features between them. Moreover, the first feature "on", "above" and "over" the second feature includes the first feature directly above and obliquely upward the second feature, or merely indicates that a level of the first feature is higher than a level of the second feature. The first feature "lower", "below" and "under" the second feature includes the first feature directly below and obliquely downward the second feature, or merely indicates that a level of the first feature is less than a level of the second feature.

In the related arts, in order to solve the problem of color deviation of a display panel in a large viewing angle direction, an optical film formed by adding a whisker to a resin is used to improve the chromaticity viewing angle of the display panel. However, inventors have found that the optical film has a limited improvement on the chromaticity viewing angle performance of the display panel, and it has been found that whisker are easily broken in the process of mixing and stirring with resin, which affect the improvement effect of the optical film on the chromaticity viewing angle performance of the display panel.

In view of the above defects, embodiments of the present disclosure provide an optical film, which can be applied to a polarizer or externally hung on a display panel to enhance the chromaticity viewing angle of a display panel. The optical film includes a resin and a light diffuser mixed with the resin. The light diffuser includes a whisker and a modifying group attached to the surface of the whisker. The modifying group has a structural formula of —X-A-R, wherein X is selected from $SO_3$ or $PO_4H$, A is selected from a single bond, a substituted or unsubstituted aromatic hydrocarbon group containing 6 to 20 ring atoms, or an imidazolinyl group, and R is selected from a substituted or unsubstituted alkyl group containing 2 to 20 carbon atoms, a substituted or unsubstituted siloxy group containing 2 to 20 carbon atoms, or an alkylolamide group containing 2 to 20 carbon atoms. Unless otherwise specified, "substituted or unsubstituted" mentioned in embodiments of the present disclosure means that the hydrogen on the carbon atom is substituted or unsubstituted by F, Cl, Br or I.

The whiskers are modified by the above-mentioned modifying groups. On the one hand, the dispersibility of the whiskers in the resin can be improved. On the other hand, due to the formation of a sulfonic shell layer or phosphate shell layer on the surface of the whisker particles, it can protect the whisker particles and enhance the toughness of the whisker particles to prevent the whiskers from broken. In addition, since the surface of the surface-modified whisker is connected with an organic layer, growth in the radial direction (short-diameter direction) is inhibited, and growth in the long direction (long-diameter direction) is unchanged, so that aspect ratio of the whiskers is increased, the probability that the whisker breaks during stirring is further reduced, and the chromaticity viewing angle of the optical film is improved, thus improving the performance.

In some embodiments, the R group may be a substituted or unsubstituted alkyl chain, which may inhibit radial growth of the whisker particles, and increase the aspect ratio of the whiskers.

Specifically, R has a general structure formula of in which $R_1$, $R_2$, $R_3$ are independently selected from F, Cl, Br, I, or H, and n is an integer from 1 to 19. The stability of the whiskers can be enhanced by modifying the end of the long chain with halogen atoms.

Optionally, the value of n may be 2, 3, 4, 5, 6, 7, 8, 9, 10, 11, 12, 13, 14, 15, 16, 17 or 18.

In some embodiments, $R_1$, $R_2$ and $R_3$ are independently selected from F or H, and at least one of $R_1$, $R_2$ and $R_3$ is selected from F. On the one hand, F—C has high bond energy and it is difficult to be destroyed. On the other hand, the F atom has a shielding effect on the C—C bond.

Furthermore, each of $R_1$, $R_2$ and $R_3$ is selected from F, i.e. all the terminal groups of R are perfluorinated. The radius of F atom is larger than that of hydrogen atom, so that the perfluorinated C—C bond can be effectively shielded and protected, thereby reducing the probability that the C—C bond is destroyed. Moreover, while protecting the C—C bond, the radius of F atom is not large enough to cause stereoscopic tension in the perfluorocarbon chain, so that the fluorocarbon chain is more stable.

In some embodiments, optionally, A is selected from a substituted or unsubstituted aromatic hydrocarbon group containing 6 to 20 ring atoms, such as phenyl, biphenyl, or naphthyl. The steric hindrance of the benzene ring is relatively large, and an organic protective layer containing the benzene ring is provided on the surface of the whiskers. During the process of mixing and stirring of the light diffuser and the resin, the organic protective layer plays the role of buffering the interaction force, thereby preventing the whiskers from breaking during stirring.

Optionally, X is a sulfonic group, and the sulfonic shell layer formed on the surface of the whiskers can protect the whiskers and prevent the whiskers from breaking during stirring, thereby achieving the effect of enhancing the toughness of the whiskers.

The modifying group is selected from at least one of the following structural formulae:

Further, modifying group is selected from at least one of the following structural formulae:

The above-mentioned modifying group are merely examples, and the modifying groups in this example are not limited thereto. The modifiers for modifying the whiskers may be selected accordingly as the modifiers corresponding to the modifying groups listed above. The modifier may be at least one of an alkyl sulfonate, a fluorinated alkyl sulfonate, an aromatic alkyl phosphate, a fluorinated aromatic alkyl phosphate, an alkyl phosphate, an alkyl phosphate salt, an aromatic alkyl phosphate, an aromatic alkyl phosphate salt, an alkylamide sulfonate, an alkylamide sulfonate salt, an imidazoline phosphate, an imidazoline phosphate salt, a siloxane phosphate, a polyphosphate, and a polyphosphate salt.

Specifically, the modifier may be at least one of sodium dodecyl sulfonate, sodium perfluoro-1-dodecyl sulfonate, sodium 4-dodecyl benzenesulfonate, sodium 3-dodecyl benzenesulfonate, sodium 1-decanesulfonate, sodium perfluoro-1-decanesulfonate, sodium 1-butanesulfonate, sodium perfluoro-1-butanesulfonate, sodium 1-octanesulfonate, sodium perfluoro-1-octanesulfonate, sodium 1-nonanesulfonate, sodium perfluoro-1-nonanesulfonate, sodium 1-pentanesulfonate, sodium perfluoro-1-pentanesulfonate, sodium 1-heptanesulfonate, sodium perfluoro-1-1-heptanesulfonate, sodium perfluoro-1-hexadecanesulfonate, sodium perfluoro-1-octadecanesulfonate, sodium 4-ethylbenzenesulfonate, sodiumdecyl benzenesulfonate sodium, sodium p-ethylbenzene sulfonate, sodium 4-octylbenzene sulfonate and sodium butylnaphthalene sulfonate.

The whiskers may be inorganic whiskers including at least one of titanium oxide, zirconium oxide, zinc oxide, calcium carbonate, calcium sulfate, boehmite, aluminum borate, calcium silicate, calcium chloride, calcium oxalate, magnesium chloride, magnesium carbonate, magnesium sulfate, magnesium sulfate hydrate, potassium titanate, barium carbonate, barium sulfate and barium chloride.

The method for modifying the light diffuser includes steps as follows: S10, dispersing the whiskers in a dispersion to form a suspension containing whiskers; S20, adding a modifier to the suspension containing whiskers and stirring to modify the whiskers to obtain a mixture; S30, removing impurities from the mixture to obtain a light diffuser.

The dispersion is a weakly alkaline or alkaline solvent, and the dispersion includes at least one of sodium hydroxide, deionized water, methanol, ethylene glycol, glycerin, n-butanol, sec-butanol and ammonia.

In S10, the mass fraction of whiskers in the suspension ranges from 5% to 20%, specifically may be 5%, 6%, 7%, 8%, 9%, 10%, 12%, 13%, 15%, 16%, 17%, 18%, 19% and 20%. The molar ratio of the modifier to the dispersion may range from 0.5:1 to 1:1, specifically 0.5:1, 0.8:1, 0.9:1 or 1:1.

In S10 and S20, the temperature of the system is controlled to range from 65° C. to 75° C., specifically, it may be 65° C., 68° C., 70° C., 72° C. or 75° C. In S20, the stirring rate may range from 700 r/min to 900 r/min, specifically 700 r/min, 720 r/min, 740 r/min, 750 r/min, 760 r/min, 780 r/min, 800 r/min, 810 r/min, 820 r/min, 850 r/min, 860 r/min, 880 r/min or 900 r/min. The modification time (reaction time)

may range from 40 min to 80 min, specifically 40 min, 50 min, 55 min, 60 min, 65 min, 70 min or 80 min.

The impurity removal treatment includes steps sequentially as follows: filtering, washing with water, filtering, washing with alcohol, vacuum drying, and grinding to obtain the modified light diffuser.

In the above modification method, the modification is carried out by stirring so that the modifier is sufficiently contacted with the whiskers in the dispersion. In this process, —OH in the dispersion dissolves part of the atoms on the whisker surface and exposes them. At this time, the functional groups in the modifier form an interaction force with the exposed surface atoms, and absorb on the surface of the whiskers. The interaction force can be adjusted by adjusting the temperature of the system, the concentration of the modifier and the stirring speed, thereby adjusting the morphology of the whiskers.

Specifically, the modification of calcium carbonate whiskers is described by using an alkylbenzene sulfonate modifier and an alkyl phosphate modifier are taken as examples.

Figure 13:
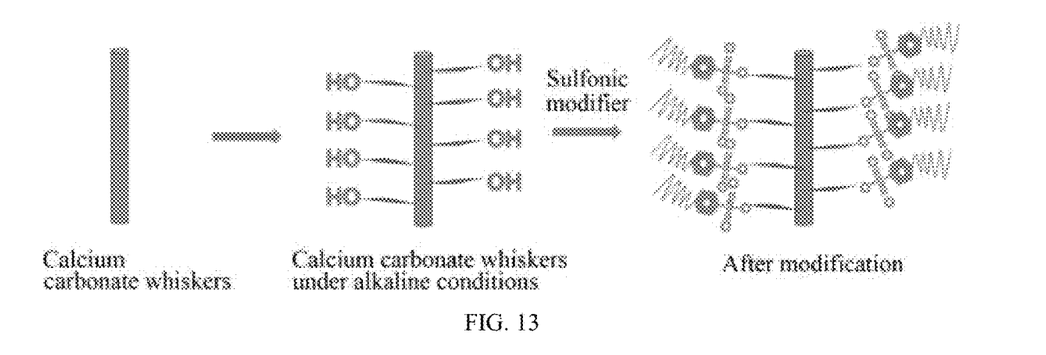
FIG. 13 is a schematic diagram of the modification mechanism of an alkylbenzene sulfonate modifier according to some embodiments of the present disclosure.

The modification mechanism of the alkylbenzene sulfonate modifier is shown in FIG. 13. Compared with ordinary modifiers, the alkylbenzene sulfonate modifier on the one hand can effectively enhance the toughness of the calcium carbonate whisker, and a benzenesulfonic shell layer is formed on the surface of the whiskers during stirring, which can protect the calcium carbonate whiskers and prevent the whiskers from breaking, thus achieving the toughening effect. On the other hand, since there is an organic layer on the surface of the calcium carbonate whiskers, growth of the calcium carbonate whiskers in the radial direction is inhibited, and growth of the calcium carbonate whiskers in the longitudinal direction is not affected, so that the aspect ratio of the calcium carbonate whiskers is increased, thereby preventing the calcium carbonate whiskers from breaking during stirring. In addition, long chains may also enhance the dispersion performance of calcium carbonate whiskers in the resin.

Figure 14:
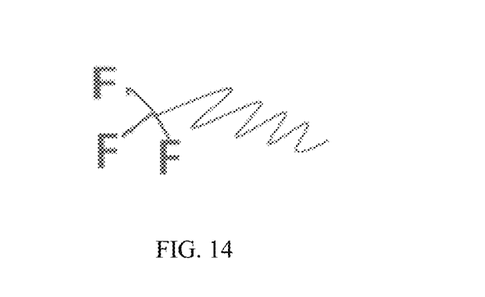
FIG. 14 is a first schematic of a modifying group on the surface of whiskers according to some embodiments of the present disclosure.
Figure 15:
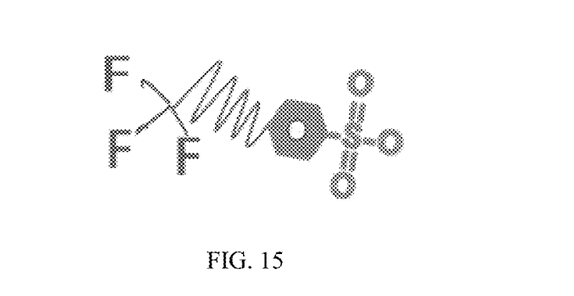
FIG. 15 is a second schematic of a modifying group on the surface of whiskers according to some embodiments of the present disclosure.

Further, the stability of the calcium carbonate whisker can be enhanced when H on the end group of the alkyl sulfonic modifier or the alkyl benzene sulfonic modifier is fully substituted by F atom. The modified groups on the surface of calcium carbonate whiskers are shown in FIGS. 14 and 15. On the one hand, F—C has high bond energy and it is difficult to be destroyed. On the other hand, the F atom has a shielding effect on the C—C bond, which can reduce the probability of C—C bond being destroyed.

Figure 16:
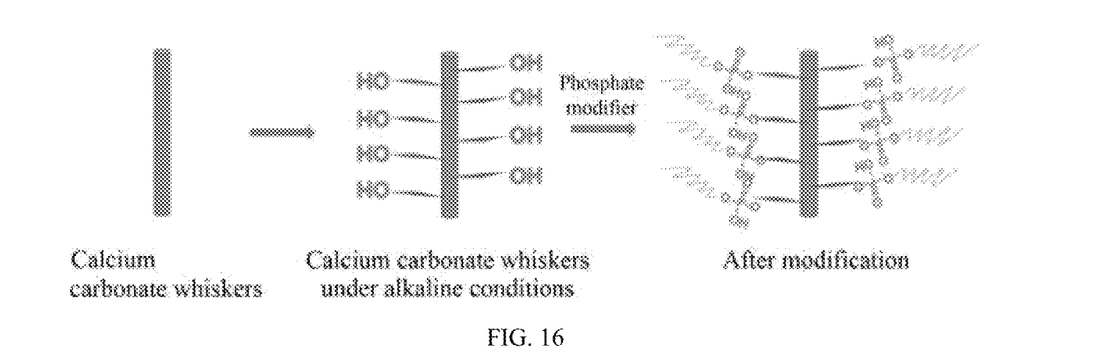
FIG. 16 is a schematic diagram of a modification mechanism of an alkyl phosphate modifier according to some embodiments of the present disclosure.

The modification mechanism of the alkyl phosphate modifier is similar to that of the alkyl sulfonic modifier, which is shown in FIG. 16.

In the embodiments of the present disclosure, the refractive index of the whisker after modification basically does not change, and the difference in refractive index between the whisker before modification and the whisker after modification is negligible. The refractive index of the light diffuser ranges from 1.5 to 2.0. Optionally, the refractive index of the light diffuser is 1.5, 1.55, 1.60, 1.65, 1.67, 1.68, 1.70, 1.75, 1.80, 1.85, 1.90, 1.95 or 2.0.

The refractive index of the resin ranges from 1.5 to 2.0. Optionally, the refractive index of the resin is 1.5, 1.55, 1.60, 1.65, 1.70, 1.75, 1.80, 1.85, 1.90, 1.95 or 2.0.

An absolute value of a difference in refractive index between the resin and the light diffuser is greater than zero and less than or equal to 0.5. Specifically, the refractive index of both the light diffuser and the resin is greater than or equal to 1.5 and less than or equal to 2.0, within this range, the effect of enlarging the chromaticity viewing angle of the optical film is better.

The preparation of the optical film includes steps as follows: mixing the light diffuser and the resin, and coating the mixture on a substrate; and performing a thermo-curing processing or an ultraviolet curing processing to obtain the optical film.

The materials resin material of the optical film in examples of the present disclosure can be selected specifically according to different positions of the optical film in the polarizer or the display panel.

The resin includes at least one of a polyvinyl alcohol resin, a transparent adhesive (such as a transparent pressure-sensitive adhesive PSA), an acrylate resin, a polyurethane resin, an epoxy resin, a vinyl resin, a silicone resin, a cellulose ester resin, a cyclic polyolefin resin, a polycarbonate resin, a polyester resin, a polyethersulfone resin, a polysulfone resin, a polyamide resin, a polyimide resin, an acyclic polyolefin resin, a polyacrylate resin, a polyvinyl alcohol resin, a polyvinyl chloride resin, and a polyvinylidene chloride resin Specifically, the polarizer includes a plurality of functional film layers, and the optical film may be reused as one of the functional film layers, or may be disposed between two adjacent functional film layers.

The preparation of the optical film can be carried out by uniformly mixing the light diffuser and the resin to obtain a mixture, and then coating the mixture on the substrate through a coating process such as spin coating, blade coating, silk-screen printing, ink-jet printing and slit coating or a stretching process.

may be prepared on the substrate by a coating process such as spin coating, doctor blending, screen printing, ink jet printing, slit coating, or a stretching process after the light diffuser and the resin are mixed uniformly.

Figure 1:
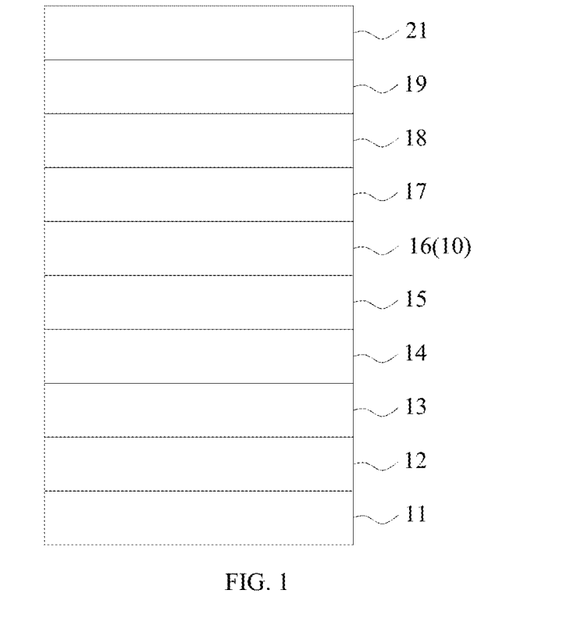
FIG. 1 is a schematic diagram of a first configuration of a polarizer according to some embodiments of the present disclosure.
Figure 2:
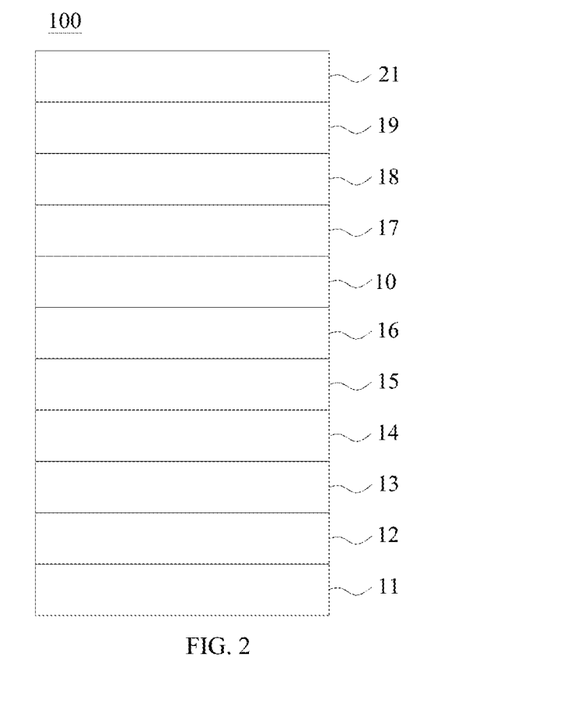
FIG. 2 is a schematic diagram of a second configuration of a polarizer according to some embodiments of the present disclosure.
Figure 3:
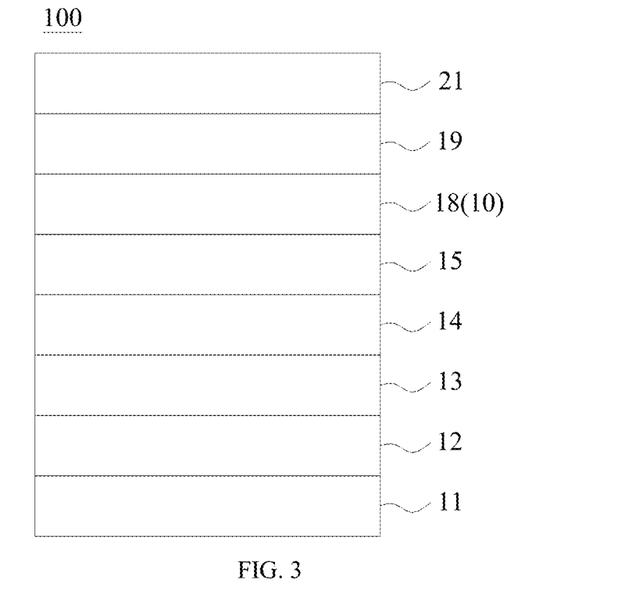
FIG. 3 is a schematic diagram of a third configuration of a polarizer according to some embodiments of the present disclosure.
Figure 4:
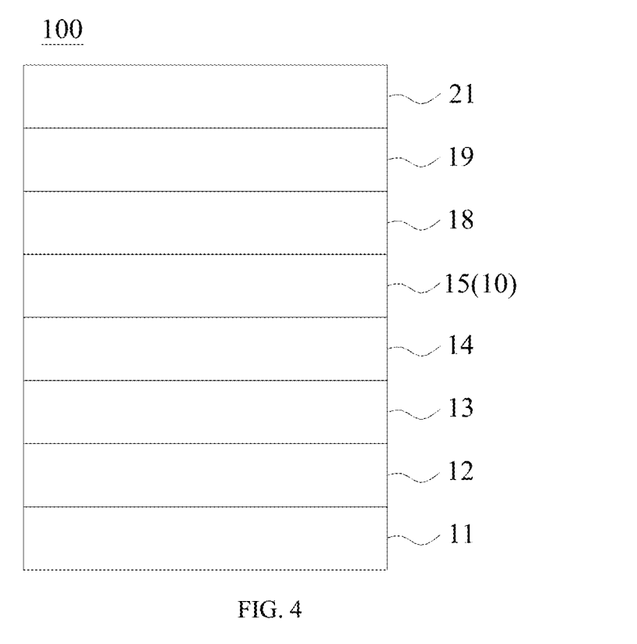
FIG. 4 is a schematic diagram of a fourth configuration of a polarizer according to some embodiments of the present disclosure.
Figure 5:
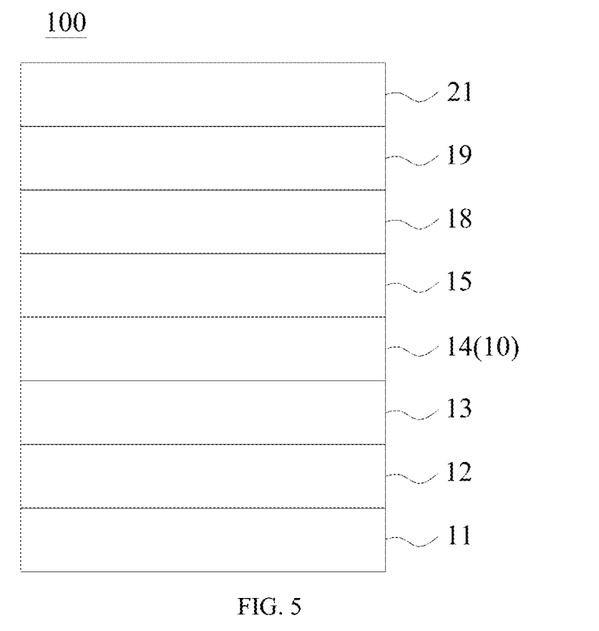
FIG. 5 is a schematic diagram of a fifth configuration of a polarizer according to some embodiments of the present disclosure.

As shown in FIGS. 1 to 5, which are schematic diagrams of different configurations of the polarizer according to embodiments of the present disclosure, respectively. The polarizer includes a release film, an optical film, and a protective film on one side of the optical film that are sequentially stacked. Specifically, the polarizer includes a release film, a first pressure-sensitive adhesive layer, an optical compensation layer, a polarizing layer, a first substrate, a hard coating, an antireflective layer, and a protective layer that are sequentially stacked, wherein the optical film can be reused as the polarizing layer, the first substrate, or the hard coating, as shown in FIGS. 3 to 5. Referring to FIG. 1, an adhesive layer is disposed between the first substrate and the hard coating, and the optical film can also be reused as the adhesive layer. Referring to FIG. 2, the optical film may also be used as a separate film layer, which is disposed between the protective layer and the polarizing layer. By integrating an optical film with modified whiskers in the polarizer, the chromaticity viewing angle of the display panel can be effectively improved.

The structure of the polarizer will be described in detail through specific examples as follows.

Referring to FIG. 1, which is a schematic diagram of a first configuration of a polarizer according to some embodiments of the present disclosure.

The polarizer 100 includes a release film 11, a first pressure-sensitive adhesive layer 12, an optical compensation layer 13, a polarizing layer 14, a first substrate 15, an adhesive layer 16, a second substrate 17, a hard coating 18, an antireflective layer 19, and a protective layer 21 that are sequentially stacked. In the use state of the polarizer 100, the direction from the release film 11 to the protective layer 21 is the stacking direction of the film layers in the polarizer 100, and it is also the incident direction of the light.

The release film 11 is used to protect the pressure-sensitive adhesive layer from being damaged before the polarizer 100 is attached onto the liquid crystal display panel, and to avoid the generation of bonding bubbles. The release film 11 may be a polyester film such as a polyethylene terephthalate film, a polyolefin film such as a polyethylene film and a polypropylene film, or a polytetrafluoroethylene film, or a film subjected to peeling treatment by using a silicone resin, a melamine resin or a urea resin, so that the release film 11 can be easily peeled off.

The first pressure-sensitive adhesive (PSA) layer 12 is disposed on one side of the release film 11. The first pressure-sensitive adhesive layer 12 is an adhesive layer for bonding the release film 11 and other film layers such as a polarizing layer 14 disposed on the release film 11. The material of the first pressure-sensitive adhesive layer 12 may be, for example, an acrylate resin The optical compensation layer 13 is disposed on one side of the first pressure-sensitive adhesive layer 12 away from the release film 11. The optical compensation layer 13 may be a compensation layer in which a liquid crystal compound is coated on the surface of the substrate 15 and is oriented and fixed or a phase difference film or the like.

The polarizing layer 14 is disposed on one side of the optical compensation layer 13 away from the first pressure-sensitive adhesive layer 12. The polarizing layer 14 may include polyvinyl alcohol. Specifically, the polarizing layer 14 may include a polyvinyl alcohol film dyed with iodine or a polyene compound obtained by dewatering the polyvinyl alcohol film.

The first substrate 15 is disposed on one side of the polarizing layer 14 away from the optical compensation layer 13. The first substrate 15 is used to protect the polarizing layer 14 and support the film layers located above the first substrate 15. The first substrate 15 may include, but is not limited to, at least one material selected from a cellulose ester resin including triacetylcellulose (TAC) or the like, a cyclic polyolefin resin including amorphous cyclic polyolefin (COP) or the like, a polycarbonate resin, a polyester resin including polyethylene terephthalate (PET) or the like, a polyethersulfone resin, a polysulfone resin, a polyamide resin, a polyimide resin, a non-cyclic polyolefin resin, a polyacrylate resin including poly(methyl methacrylate resin) or the like, a polyvinyl alcohol resin, a polyvinyl chloride resin, and a polyvinylidene chloride resin. Specifically, the material of the first substrate 15 is PET.

The adhesive layer 16 may be a pressure-sensitive adhesive layer, which is referred to as a second pressure-sensitive adhesive layer 16 hereinafter. The second pressure-sensitive adhesive layer 16 is disposed on one side of the first substrate 15 away from the polarizing layer 14. The second pressure-sensitive adhesive layer 16 is the same as the first pressure-sensitive adhesive layer 12, and is an adhesive layer for bonding the first substrate 15 and the second substrate 17. A resin material in the second pressure-sensitive adhesive layer 16 is the same as that in the first pressure-sensitive adhesive layer 12, and the description thereof is omitted here.

In this embodiment, the optical film 10 is reused as an adhesive layer 16, that is, the modified whiskers are doped in the second pressure-sensitive adhesive layer 16.

The second substrate 17 is disposed on one side of the second pressure-sensitive adhesive layer 16 away from the first substrate 15. The second substrate 17 is used to support the film layers above the second substrate 17. An optional material of the second substrate 17 is the same as that of the first substrate 15, and the description thereof is omitted here. Specifically, the material of the second substrate 17 is PET.

The hard coating 18 is disposed on one side of the second substrate 17 away from the second pressure-sensitive adhesive layer 16. The hard coating 18 has characteristics of high hardness, water resistance and oil resistance, which can well prevent surfaces of the underlying film layer from being scratched and is easier to clean. Optionally, the hard coating 18 has a high glass transition temperature, for example ranging from 70 degrees Celsius to 120 degrees Celsius. The material of the hard coating 18 may include at least one of polyurethane resins, acrylate resins, epoxy resins, vinyl resins, or silicone resins The antireflective layer (AR) layer 19 is disposed on one side of the hard coating 18 away from the second substrate 17. The antireflective layer 19 is used to prevent reflections and scratches. The antireflective layer 19 is, for example, a dielectric thin film formed on the surface of the hard coating 18.

The protective layer 21 is used to protect the underlying film layers. The protective layer 21 may be a transparent resin film formed by the following materials: thermoplastic resin such as linear polyolefin resins (polypropylene-based resin or the like), cyclic polyolefin resins (norbornene resins or the like), or the like; cellulose ester resins such as cellulose triacetate and cellulose diacetate; polyester resins such as polyethylene terephthalate, polyethylene naphthalate, and polybutylene terephthalate; polycarbonate resins; and (methyl) acrylic resins; or a mixture thereof, or a copolymer thereof, or the like.

Besides the above-mentioned film layers, the polarizer 100 may include other film layers such as an antistatic layer, which will not be described herein Referring to FIG. 2, which is a schematic diagram of a second configuration of a polarizer according to some embodiments of the present disclosure.

The second configuration of the polarizer shown in FIG. 2 differs from the first configuration of the polarizer shown in FIG. 1 in that the optical film 10 is provided as a separate film layer, and the optical film 10 is disposed between the protective layer and the polarizing layer. Specifically, the optical film 10 is disposed between the second pressure-sensitive adhesive layer 16 and the second substrate 17.

The resin in the optical film 10 includes at least one of a polyurethane resin, an acrylate resin, an epoxy resin, a vinyl resin and a silicone resin.

Referring to FIG. 3, which is a schematic diagram of a third configuration of a polarizer according to some embodiments of the present disclosure.

In this embodiment, the polarizer 100 includes a release film 11, a first pressure-sensitive adhesive layer 12, an optical compensation layer 13, a polarizing layer 14, a first substrate 15, a hard coating 18, an antireflective layer 19, and a protective layer 21 that are sequentially stacked. The function and material of each of the plurality of functional film layers are the same as those of the corresponding film layer shown in FIG. 1, and details are not described herein. The third configuration of the polarizer shown in FIG. 3 differs from the first configuration shown in FIG. 1 in that the optical film 10 is reused as a hard coating, that is, the modified whiskers are doped into the hard coating. Further, in this embodiment, the second substrate and the second pressure-sensitive adhesive layer may be omitted, and only the first substrate may be disposed. By omitting the second substrate, the structure of the polarizer 100 can be simplified, and the brightness and the contrast thereof can also be improved.

The resin in the optical film 10 includes at least one of a polyurethane resin, an acrylate resin, an epoxy resin, a vinyl resin and a silicone resin.

Referring to FIG. 4, which is a schematic diagram of a fourth configuration of a polarizer according to some embodiments of the present disclosure.

This embodiment differs from the third configuration of the polarizer shown in FIG. 3 in that the optical film 10 is reused as the first substrate 15, that is, the modified whiskers are doped into the first substrate 15.

The resin of the optical film 10 includes at least one material selected from a cellulose ester resin including triacetylcellulose (TAC) or the like, a cyclic polyolefin resin including amorphous cyclic polyolefin (COP) or the like, a polycarbonate resin, a polyester resin including polyethylene terephthalate (PET) or the like, a polyethersulfone resin, a polysulfone resin, a polyamide resin, a polyimide resin, a non-cyclic polyolefin resin, a polyacrylate resin including poly(methyl methacrylate resin) or the like, a polyvinyl alcohol resin, a polyvinyl chloride resin, and a polyvinylidene chloride resin.

Referring to FIG. 5, which is a schematic diagram of a fifth configuration of a polarizer according to some embodiments of the present disclosure.

This embodiment differs from the third configuration of the polarizer shown in FIG. 3 in that the optical film 10 is reused as the polarizing layer 14, that is, the modified whiskers are doped in the polarizing layer 14.

The resin of the optical film 10 in this embodiment is polyvinyl alcohol. The optical film 10 may be prepared by a stretching process.

The whiskers in the optical film 10 of any of the above embodiments are directionally arranged. During the coating process, the light diffusers can be directionally arranged in the film layers by coating shear forces. The light diffusers that are directionally arranged in the optical film 10 can scatter light, so that the light diffuses toward both sides, thereby enlarging the chromaticity viewing angle of the display panel. Further, the optical film with the light diffusers has no adversely affects on the brightness of the liquid crystal display device in the front viewing angle.

Figure 12:
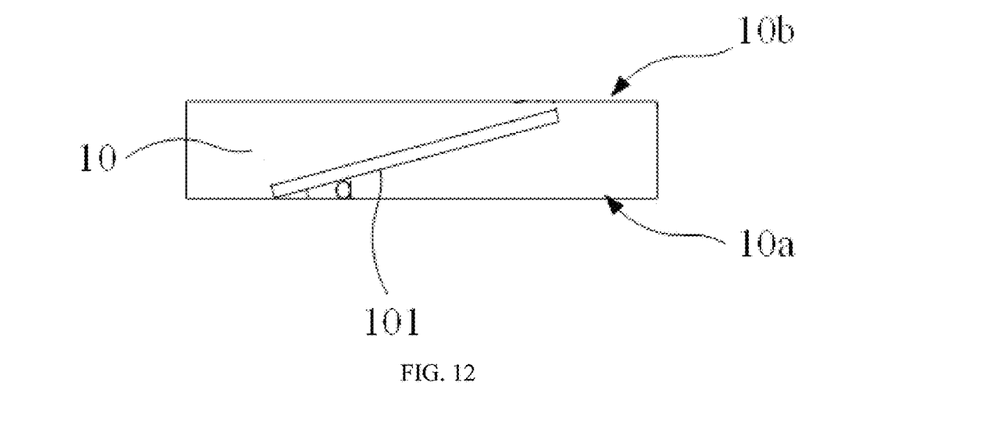
FIG. 12 is a schematic diagram of the arrangement of light diffusers of an optical film according to some embodiments of the present disclosure.

As shown in FIG. 12, an included angle α is formed between a long-axis direction of the whisker 101 and a bottom surface 10a of the optical film 10. When the included angle α is greater than or equal to 0 degree and less than or equal to 40 degree, it is beneficial to improve the contrast, brightness viewing angle and chromaticity viewing angle. Specifically, since the length of the whisker is fixed, the amount of light scattered by the whisker is fixed. The amount of light scattered by the whisker can be divided into components (abbreviated as left and right components) in a direction of the whisker being parallel to the bottom surface of the resin layer and components (abbreviated as upper and lower components) in a direction of the whisker being perpendicular to the bottom surface of the resin layer. If the left and right components are large, the upper and lower components are small. In case the angle between the whisker and the resin layer is smaller, and the left and right components are larger (i.e., the projection of the whisker on the resin layer is larger), the left and right scattering is stronger, and the left and right viewing angle performance is better, vice versa.

The optical film 10 includes a bottom surface 10a and a top surface 10b that are opposite to each other in the stacking direction of the film layers. Optionally, the bottom surface 10a is located on the light-incident side of the top surface 10b (i.e., the light-emitting side of the display panel), or the bottom surface 10a is the surface formed firstly when the optical film 10 is formed.

Furthermore, the experimental results show that when the included angle between the long-axis direction of the whisker and the bottom surface of the optical film 10 is less than or equal to 20 degree, the contrast, brightness viewing angle and chromaticity viewing angle are further improved. Specifically, the angle between the long-axis direction of the whisker and the bottom surface 10a of the optical film 10 is zero degree, that is, the alignment direction of the whiskers is parallel to the bottom surface 10a of the optical film 10. Further, the long-axis direction of the optical film 10 may be the same as the absorption axis direction of the polarizer.

Figure 6:
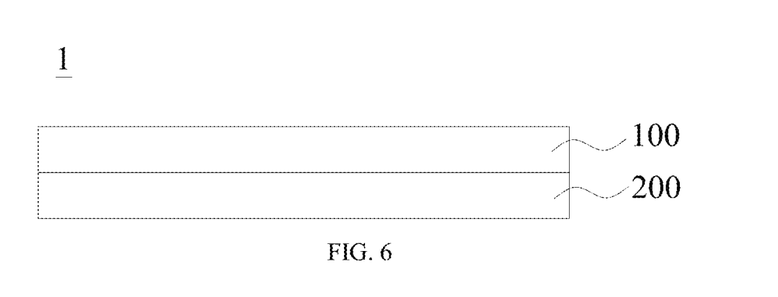
FIG. 6 is a schematic diagram of a first configuration of a display device according to some embodiments of the present disclosure.

Referring to FIG. 6, which is a schematic diagram of a first configuration of a display device according to some embodiments of the present disclosure. The display device 1 includes any of the above-described polarizers 100 and a display panel 200. The polarizer 100 is disposed on the light-emitting side of the display panel 200, that is, the polarizer 100 is an upper polarizer of the display panel 200. The display panel 200 may be a liquid crystal display panel. It can be understood that the liquid crystal display device further includes a structure such as a lower polarizer, a backlight module, and a middle frame. Reference may be made to the related arts, and details are not described herein.

Figure 7:
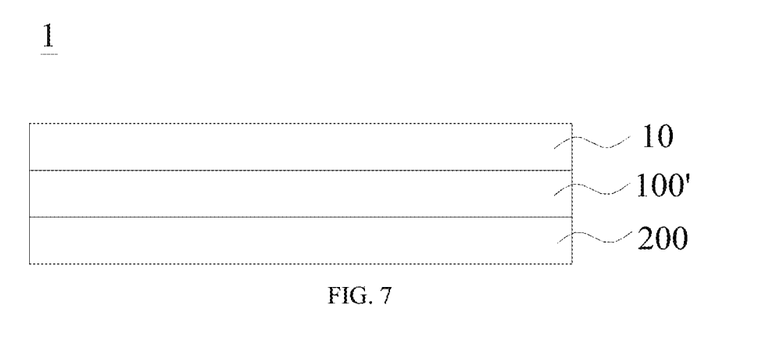
FIG. 7 is a schematic diagram of a second configuration of a display device according to some embodiments of the present disclosure.

Referring to FIG. 7, which is a second configuration diagram of a display device according to some embodiments of the present disclosure. The display device 1 includes a display panel 200, an upper polarizer 100' located on the display panel 200, and an optical film 10 located on one side of the upper polarizer 100' away away from the display panel 200. This embodiment differs from the first configuration of the liquid crystal display device shown in FIG. 6 is that the optical film 10 is not integrated in the upper polarizer, but is externally hung on the polarizer 100'.

The upper polarizer 100' in this embodiment may be a general polarizer, including a release film, a pressure-sensitive adhesive layer, an optical compensation layer, a polarizing layer, a first substrate, a hard coating, an antireflective layer, a protective layer, and the like that are sequentially stacked.

The resin of the optical film 10 includes at least one of a polyurethane resin, an acrylate resin, an epoxy resin, a vinyl resin and a silicone resin.

The performance of the optical film provided herein is verified by the following specific examples.

Example 1

Modification of the whiskers: dispersing calcium carbonate whiskers in a dispersion at 70° C. to obtain a suspension containing whiskers at a concentration of 8 wt %. The dispersion is a deionized aqueous solution of sodium hydroxides, and the concentration of sodium hydroxides is 20 g/L. Then adding perfluorinated dodecylbenzene sulfonic acid at a stirring rate of 800 r/min and reacting for 60 min to obtain a mixture, wherein the molar ratio of the perfluorinated dodecylbenzene sulfonic acid to the sodium hydroxides is 1:1. Followed by subjecting the mixture sequentially to filtering, washing with water, filtering, washing with alcohol, drying under vacuum, and grinding to finally obtain the light diffuser.

Figure 8:
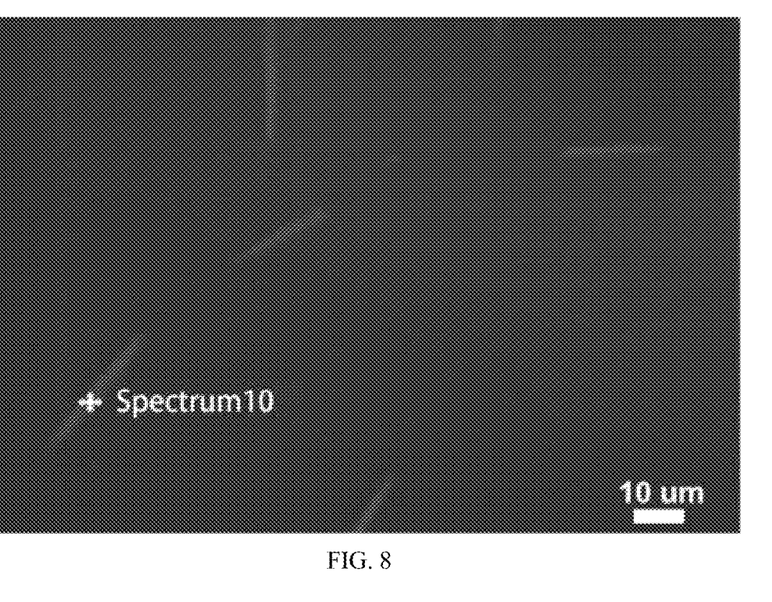
FIG. 8 is an enlarged schematic view of modified-whiskers under a microscope.
Figure 9:
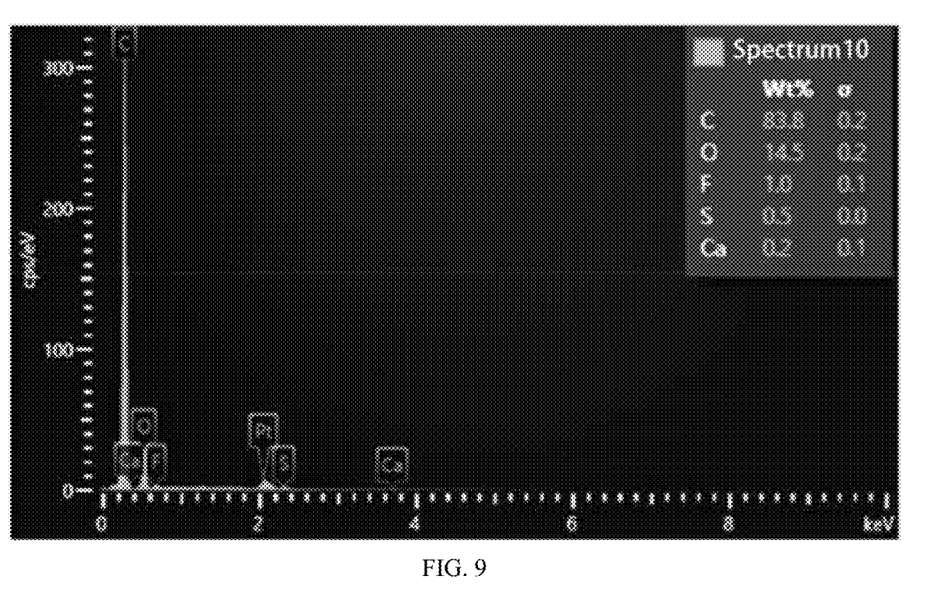
FIG. 9 is an EDS diagram of the position where the spectrum 10 located in FIG. 8.

The above modified calcium carbonate whiskers are subjected to dispersion spectrum (EDS) analysis, as shown in FIG. 8 and FIG. 9. FIG. 8 is an enlarged schematic view of modified-whiskers under a microscope, and FIG. 9 is an EDS diagram of the position where the spectrum 10 located in FIG. 8. It can be seen from FIG. 9 that the modified whiskers contain C, O, S, F, and Ca elements, demonstrating that the surface of the whiskers has been modified.

Preparation of the optical film: mixing 100 parts of PSA original adhesive, 1.3 parts of a modified whiskers, and 0.1 part of a glue additive to obtain a mixture, wherein the viscosity of the PSA original adhesive is 1000 cp. Then subjecting the mixture to fully stirring, standing for defoaming and filtering, and then scraping on the surface of the first substrate (SRF), followed by performing a thermo-curing. The thermo-curing is carried out at a temperature of 80° C. for 3 min. The film thickness is 25 μm.

Comparative Example 1

Whiskers: Calcium carbonate whiskers that have not been modified.

Preparation of the optical film: this method differs from Example 1 in that the whiskers are calcium carbonate whiskers that have not been modified, and the other steps are the same.

Figure 10:
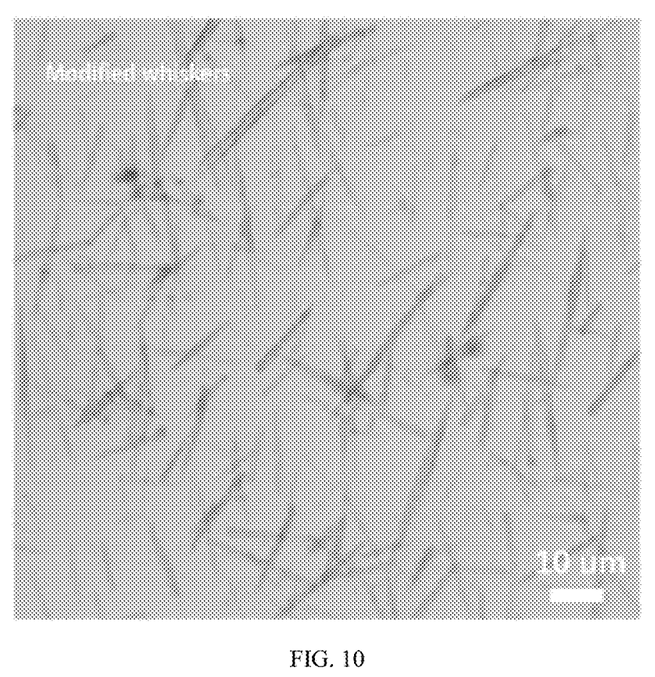
FIG. 10 is a micrograph of the modified calcium carbonate whiskers in Example 1.
Figure 11:
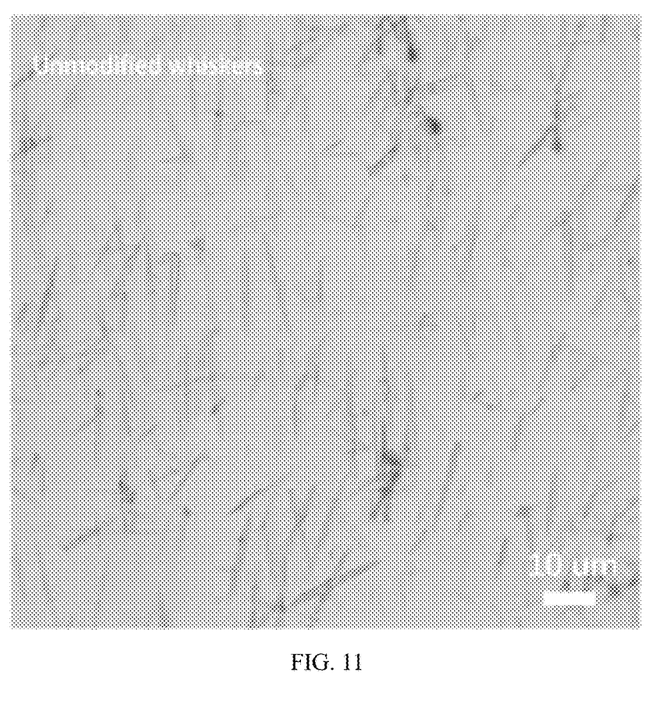
FIG. 11 is a micrograph of the unmodified calcium carbonate whiskers in Comparative Example 1.

The lengths of whiskers in the optical films of the above-mentioned Example 1 and Comparative Example 1 are tested, as shown in FIGS. 10 and 11. FIG. 10 is a micrograph of the modified calcium carbonate whiskers in Example 1. FIG. 11 is a micrograph of the unmodified calcium carbonate whiskers in Comparative Example 1. The average length of the unmodified calcium carbonate whiskers is 15 μm, and the average length of the modified calcium carbonate whiskers is 25 μm, and there is no significant difference in the short diameter between them. It can be seen that the aspect ratio of the whiskers in the optical film provided in embodiments of the present disclosure is improved, which can improve the phenomenon that the whiskers are easy to break during stirring can be improved.

Device Example 1

Preparation of the device: applying the optical film obtained in Example 1 to the polarizer shown in FIG. 1, and bonding the polarizer to the display panel. The long-axis direction of the whiskers is parallel to the absorption axis direction of the polarizing layer.

Device Comparative Example 1

Preparation of the device: this method differs from the device of Example 1 in that the optical film obtained in Comparative Example 1 is applied to the polarizer shown in FIG. 1, and the other steps and structures are the same.

The structures of the devices in above-mentioned Device Example 1 and Device Comparative Example 1 are optically tested, and the results are shown in Table 1 below.

TABLE 1

| Device | Transmittance | Bright state (nit) | Dark state (nit) | Contrast | Brightness viewing angle (0.5) | Ceci viewing angle (0.02) |
|---|---|---|---|---|---|---|
| Device Example 1 | 4.3% | 292.77 | 0.1095 | 2674 | 150 | 120 |
| Device Comparative Example 1 | 4.15% | 282 | 0.1151 | 2455 | 145 | 118 |

As can be seen from Table 1, compared with the devices in Device Comparative Example 1, the performance of the devices in Device Example 1 is improved in terms of transmittance, contrast and brightness viewing angle. The possible reason is that the stability and toughness of the modified whiskers in the optical film provided in embodiments of the present disclosure are improved, and the modified whiskers are not easily broken during the preparation process, thereby effectively improving the effects of the optical film on the performance of the display device.

In summary, embodiments of the present disclosure provide an optical film, a polarizer and a display device. The optical film includes a resin and a light diffuser mixed with the resin. The light diffuser includes a whisker and a modifying group attached to a surface of the whisker. The modifying group has a formula of —X-A-R, wherein X is selected from $SO_3$ or $PO_4H$, A is selected from a single bond, a substituted or unsubstituted aromatic hydrocarbon group containing 6 to 20 ring atoms, or an imidazolinyl group, and R is selected from a substituted or unsubstituted alkyl group containing 2 to 20 carbon atoms, a substituted or unsubstituted siloxy group containing 2 to 20 carbon atoms, or an alkylolamide group containing 2 to 20 carbon atoms. On the one hand, the optical film provided in the embodiments of the present disclosure can improve the dispersibility of the whiskers in the resin. On the other hand, due to the formation of a sulfonic shell layer or phosphate shell layer on the surface of the whisker particles, it can protect the whisker particles and enhance the toughness of the whisker particles to prevent the whiskers from broken. In addition, since the surface of the surface-modified whisker is connected with an organic layer, growth in the radial direction (short-diameter direction) is inhibited, and growth in the longitudinal direction (long-diameter direction) is unchanged, so that aspect ratio of the whiskers is increased, the probability that the whisker breaks during stirring is further reduced, and the chromaticity viewing angle of the optical film is improved, thus improving the performance.

In the above-mentioned embodiments, the description of each embodiment has its own focus. For parts that are not described in detail in a certain embodiment, please refer to related descriptions of other embodiments.

In view of the foregoing, the optical film, polarizer, and display device provided in embodiments of the present disclosure have been described in detail above, and the principles and embodiments of the present disclosure are described by using specific examples herein. Descriptions of the above embodiments are merely intended to help understand the technical solutions and core ideas of the present disclosure. A person with ordinary skill in the art should understand that various modifications may still be made to the technical solutions described in the foregoing embodiments, or equivalents may be made to some of the technical features therein. These modifications or substitutions do not

What is claimed is:

1. An optical film comprising a resin and a light diffuser mixed with the resin, wherein the light diffuser comprises a whisker and a modifying group attached to a surface of the whisker through a chemical bond, and the modifying group has a structural formula of ▬X-A-R, wherein ▬ is a single bond, X is PO$_4$H, A is an unsubstituted aromatic hydrocarbon group containing 6 ring atoms, and R is selected from a substituted or unsubstituted siloxy group containing 2 to 20 carbon atoms.

2. The optical film according to claim 1, wherein the modifying group is:

3. The optical film according to claim 1, wherein the resin comprises at least one of a transparent adhesive, an acrylate resin, a vinyl resin, and a polyester resin.

4. The optical film according to claim 1, wherein the resin comprises at least one of a cyclic polyolefin resin, an acyclic polyolefin resin, a polyurethane resin, an epoxy resin, a silicone resin, a cellulose ester resin, a polycarbonate resin, a polyethersulfone resin, a polysulfone resin, a polyamide resin, a polyimide resin, a polyacrylate resin, a polyvinyl alcohol resin, a polyvinyl chloride resin, and a polyvinylidene chloride resin.

5. The optical film according to claim 1, wherein an absolute value of a difference in refractive index between the resin and the light diffuser is greater than zero and less than or equal to 0.5; and/or
a refractive index of the light diffuser is greater than or equal to 1.5 and less than or equal to 2.0; and/or
a refractive index of the resin is greater than or equal to 1.5 and less than or equal to 2.0.

6. The optical film according to claim 1, wherein an included angle is formed between a long axis direction of the whisker of the optical film and a bottom surface of the optical film, and the included angle is greater than or equal to 0 degree and less than or equal to 40 degrees.

7. A polarizer comprising the optical film according to claim 1, a protective layer disposed on one side of the optical film, and a release film disposed on an opposite side of the optical film.

8. The polarizer according to claim 7, wherein the polarizer comprises the release film, a polarizing layer, a first substrate, a hard coating, and the protective layer that are sequentially stacked;
wherein the optical film is reused as the polarizing layer, the first substrate, or the hard coating; and/or
an adhesive layer is disposed between the first substrate and the hard coating, and the optical film is reused as the adhesive layer; and/or
the optical film is disposed between the protective layer and the polarizing layer.

9. The polarizer according to claim 7, wherein the modifying group is:

10. The polarizer according to claim 7, wherein the resin comprises at least one of a transparent adhesive, an acrylate resin, a vinyl resin, and a polyester resin.

11. The polarizer according to claim 7, wherein the resin comprises at least one of a cyclic polyolefin resin, an acyclic polyolefin resin, a polyurethane resin, an epoxy resin, a silicone resin, a cellulose ester resin, a polycarbonate resin, a polyethersulfone resin, a polysulfone resin, a polyamide resin, a polyimide resin, a polyacrylate resin, a polyvinyl alcohol resin, a polyvinyl chloride resin, and a polyvinylidene chloride resin.

12. The polarizer according to claim 7, wherein an absolute value of a difference in refractive index between the resin and the light diffuser is greater than zero and less than or equal to 0.5; and/or
a refractive index of the light diffuser is greater than or equal to 1.5 and less than or equal to 2.0; and/or
a refractive index of the resin is greater than or equal to 1.5 and less than or equal to 2.0.

13. The polarizer according to claim 7, wherein an included angle is formed between a long axis direction of the whisker of the optical film and a bottom surface of the optical film, and the included angle is greater than or equal to 0 degree and less than or equal to 40 degrees.

14. A display device comprising a display panel and the polarizer according to claim 7, wherein the polarizer is disposed on a light-emitting side of the display device.

15. A display device comprising a display panel, a polarizer, and the optical film according to claim 1 that are sequentially stacked.

16. A display device comprising a display panel and the polarizer according to claim 8, wherein the polarizer is disposed on a light-emitting side of the display device.

* * * * *